US00RE40649E

(19) United States
(12) Reissued Patent
Farr

(10) Patent Number: US RE40,649 E
(45) Date of Reissued Patent: Mar. 10, 2009

(54) ADJUSTABLE SHOCK ABSORBER

(75) Inventor: Neil Farr, Toronto (CA)

(73) Assignee: ArvinMeritor Technology, LLC, Troy, MI (US)

(21) Appl. No.: 10/795,144

(22) Filed: Mar. 5, 2004

Related U.S. Patent Documents

Reissue of:
(64) Patent No.: 6,648,109
Issued: Nov. 18, 2003
Appl. No.: 09/951,179
Filed: Sep. 13, 2001

(51) Int. Cl.
*F16F 9/48* (2006.01)

(52) U.S. Cl. ..... 188/287; 188/285; 188/322.19; 188/315

(58) Field of Classification Search ..... 188/287, 188/285, 315, 322.19, 286, 314, 267, 267.1, 188/267.2, 266.1–266.6, 282.8; 623/44, 39, 623/26, 43
See application file for complete search history.

(56) References Cited

U.S. PATENT DOCUMENTS 3,176,972 A * 4/1965 Deschner ..... 188/287
3,207,270 A 9/1965 Ellis
3,750,856 A 8/1973 Kenworthy
3,840,097 A 10/1974 Holley
4,026,533 A 5/1977 Hennells
4,056,040 A 11/1977 Fussangel
4,059,175 A * 11/1977 Dressell et al. ..... 188/285
4,151,784 A 5/1979 Fussangel
4,702,355 A 10/1987 Heideman
4,819,770 A 4/1989 Hahn
5,050,712 A 9/1991 Heideman
5,305,860 A * 4/1994 Rotharmel et al. ..... 188/266.2
5,464,079 A 11/1995 Lohberg
5,948,021 A 9/1999 Radcliffe
5,988,330 A * 11/1999 Morris ..... 188/322.15
6,112,868 A 9/2000 Graham

FOREIGN PATENT DOCUMENTS

DE 25 06 451 A1 8/1976
EP 01293702 A3 * 12/2003
GB 1389523 4/1975

OTHER PUBLICATIONS

Search Report, dated Oct. 10, 2003.

* cited by examiner

*Primary Examiner*—Thomas J Williams
(74) *Attorney, Agent, or Firm*—Carlson, Gaskey, Olds

(57) ABSTRACT

A shock absorber assembly includes a damping adjustment mechanism that can easily be incorporated into a twin cylinder design. The shock absorber includes an outer cylinder and an inner cylinder mounted within the outer cylinder. The inner cylinder is spaced apart from the outer cylinder to define a gap. A piston is mounted within a fluid filled chamber formed within the inner cylinder to dampen vibrations. Holes are drilled into the wall of the inner cylinder to provide fluid ports that can communicate with the gap to form a bi-directional fluid path as the piston moves back and forth within the chamber to dampen vibrations. To provide variable damping, the outer cylinder includes an eccentric inner diameter to outer diameter profile that allows damping adjustment between high and low damping forces. The damping force is adjusted by rotating the outer cylinder relative to the inner cylinder to vary the size of the gap with respect to the ports.

14 Claims, 3 Drawing Sheets

ADJUSTABLE SHOCK ABSORBER

Matter enclosed in heavy brackets [ ] appears in the original patent but forms no part of this reissue specification; matter printed in italics indicates the additions made by reissue.

BACKGROUND OF THE INVENTION

This invention relates to a device and method for adjusting damping in a vehicle shock absorber.

Vehicles utilize shock absorbers to dampen vibrations and shocks experienced by a vehicle. Variations in payload and ground conditions can affect vehicle control and handling. Having the ability to selectively adjust the damping force in a shock absorber is desirable to improve vehicle control and handling in response to these variables. Some shock absorbers include position sensing technology and damping adjustment that permit a vehicle operator to selectively change damping to a desired level.

Current adjustment systems rely on external components or adjuster modules to provide adjustment. Utilizing additional components significantly increases cost and assembly time. Thus, the adjustment feature is not typically incorporated on most vehicles.

It is desirable to provide a shock absorber with an adjustment mechanism that utilizes components already found within the shock absorber, and which can be easily adjusted by a vehicle operator to control damping levels. The adjustment mechanism should also be cost effective in addition to overcoming the above referenced deficiencies with prior art systems

SUMMARY OF THE INVENTION

The subject invention provides a shock absorber that includes damping adjustment for a twin cylinder configuration having an inner cylinder mounted within an outer cylinder in a spaced relationship to form a flow gap. Simultaneous and/or independent compression and rebound damping adjustment is achieved by moving the outer cylinder with respect to the inner cylinder to adjust flow gap size around flow ports formed within the inner cylinder. The outer cylinder can be rotated or axially translated relative to the inner cylinder to adjust gap size.

In the preferred embodiment, this is accomplished by the outer cylinder having an eccentric inner diameter to outer diameter profile to control the width of the flow gap is in relation to the ports. The outer cylinder forms an outer wall of the shock absorber and the inner cylinder forms an inner wall of the shock absorber. The outer wall is defined by an outer diameter that has a first center and an inner diameter that has a second center that is different than the first center to form the eccentric profile. The eccentricity of the outer wall adjusts flow gap size as the outer cylinder is rotated or translated to adjust damping. The eccentricity is formed by varying the wall thickness or profile of the outer cylinder. Multiple eccentricities to provide multiple gap size variations are achieved by forming the outer wall with several different thicknesses about the circumference.

In one embodiment, the eccentricity is uniform such that the gap is uniform in cross-section along the length of the cylinders. The shock absorber is adjustable between a low damping force where the gap size is defined by a first width in relation to the ports and a high damping force where the gap size is defined by a second width in relation to the ports that is less than the first width.

In an alternate embodiment, the eccentricity is variable such that the gap is nonuniform in cross-section along the length of the cylinders. The variable eccentricity results from an inner surface of the outer wall having a stepped or tapered profile. The steps or taper provide variable gap widths for each of the ports.

These and other features of the present invention can be best understood from the following specification and drawings, the following of which is a brief description.

DETAILED DESCRIPTION OF AN EXEMPLARY EMBODIMENT

Figure 1:
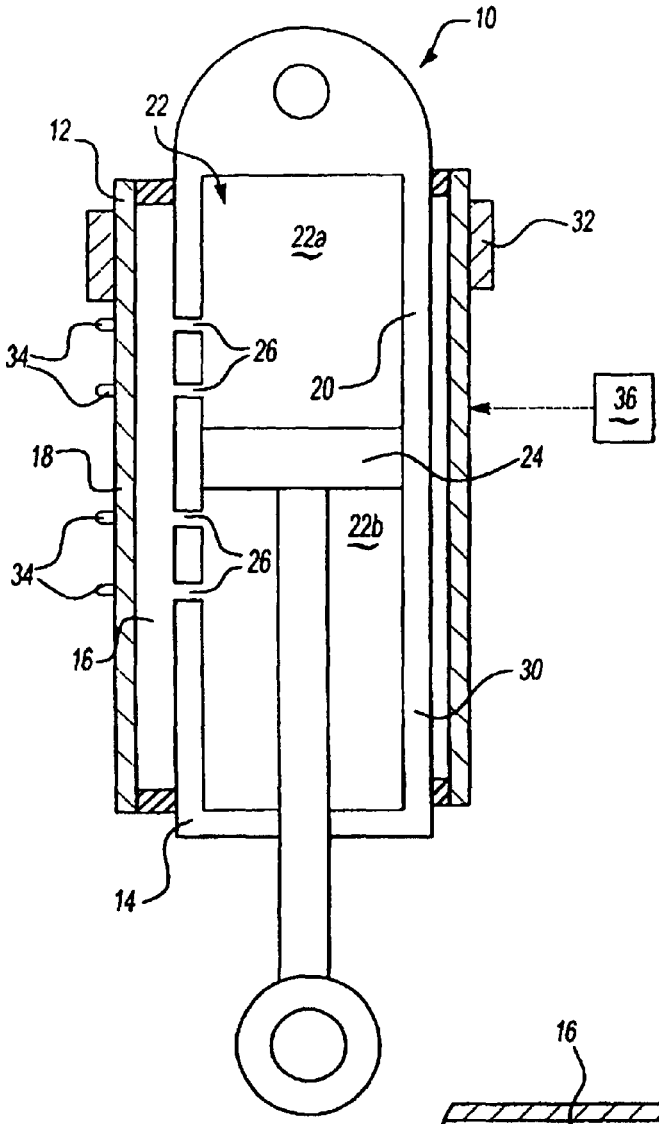
FIG. 1 is a schematic representation of a shock absorber incorporating the subject invention.

Referring to FIG. 1, a shock absorber assembly is shown generally at 10. The shock absorber 10 includes an outer cylinder 12 and an inner cylinder 14 mounted within the outer cylinder 12 in a spaced relationship to form a flow gap 16. The outer cylinder 12 forms an outer wall 18 of the shock absorber 10 and the inner cylinder 14 forms the inner wall 20 of the shock absorber 10.

The inner wall 20 defines a chamber 22 in which a plunger or piston member 24 is mounted. Fluid is sealed within the chamber 22, as is known in the art, and is compressed by the piston 24 to dampen vibrations. Any type of known fluid can be used, including hydraulic fluid or gas either of which could be compressible or incompressible, for example.

Multiple ports 26 are formed within the inner wall 20. The ports 26 are preferably formed on only one side of the inner cylinder 14 to define a ported side 28 and non-ported side 30 of the inner cylinder 14. The ports 26 allow fluid communication with the gap 16 as the piston 24 moves within the chamber 22.

The piston 24 separates the chamber 22 into a compression side 22a and a rebound side 22b. There are ports 26 positioned on both the compression 22a and rebound 22b sides. As vibrations are dampened, fluid flows from the rebound side 22b to the compression side 22a and/or vice versa via the ports 26 and gap 16. Thus, fluid flow can be bi-directional between the rebound 22b and compression 22a sides or check valves can be used to allow fluid to flow in one direction while preventing fluid flow in an opposite direction. Fluid also flows back and forth between the rebound 22b and compression 22a sides via disc valves (not shown) through the piston 24 as known in the art. The operation of disc and check valves is well known and will not be discussed in further detail.

The subject invention provides an adjustment mechanism for varying the damping force of the shock absorber 10 that can be selectively actuated by a vehicle operator. It is desirable to control damping force to provide improved vehicle control and handling to accommodate vehicle payload changes or ground condition changes. For example, one vehicle application in which shock absorber damping adjustment is desirable is for snowmobiles. Aggressive drivers may desire high damping forces while non-aggressive drivers desire lower damping forces. Or, if more than one passenger is riding on the snowmobile it may be desirable to change the damping force to accommodate the additional weight.

Damping force adjustment is accomplished by selectively rotating or axially translating the outer cylinder 12 with respect to the inner cylinder 14 to vary the size of the gap 16 in relation to the ports 26. The rotation or translation of the outer cylinder 12 is accomplished by any of various types of actuation methods. For example, the outer cylinder 12 can be manually moved by the operator or can be electrically moved upon selection of a desired damping position by the operator.

For manual rotation or translation, a grip portion 32 can be formed on the outer surface of the outer cylinder 12 and a label or markings 34 can be made on the outer cylinder 12 to indicate various adjustment positions. The grip portion 32 can be positioned anywhere along the length of the outer cylinder 12 and can be a separate member attached to or formed within the cylinder 12, as shown in FIG. 1, or can simply be defined as any exterior surface presented by the outer cylinder 12.

For electrical rotation or translation, a controller and motor 36 can be selectively actuated by the operator to move the outer cylinder 12. A push-button, switch, dial, or toggle (not shown) can be selected to power the system.

Figure 2:
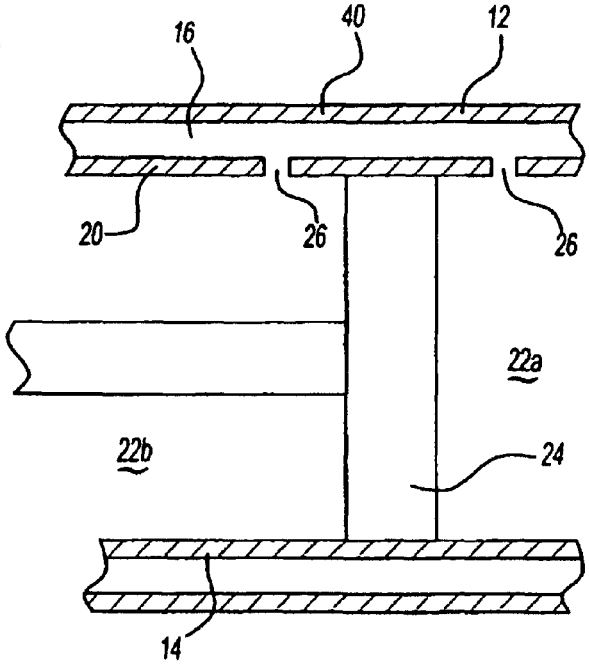
Fig-2 PRIOR ART
FIG. 2 is a cross-sectional cut-away view of a prior art shock absorber.

As discussed above, the damping adjustment occurs as a result of variation in flow gap size. One way to vary the flow gap size is by varying the thickness or profile of the outer wall 18. In prior art systems, shown in FIG. 2, the outer cylinder 12 was defined by a wall 40 having equal thickness about the circumference of the cylinder 12. With this configuration the flow gap 16 has a constant and uniform width between the inner 14 and outer 12 cylinders. As the piston 24 moves back and forth in the chamber 22, fluid flows back and forth between the compression 22a and rebound 22b sides via the ports 26 and gap 16 and there is a constant damping force.

As indicated above, in one embodiment the subject invention varies flow gap size by eccentrically forming the outer wall 18, as shown in FIGS. 3–5. The outer wall 18 is defined by an outer diameter and an inner diameter that have different centers creating an eccentric inner diameter to outer diameter profile. This is accomplished by forming one portion of the outer cylindrical wall 18 with greater thickness than another portion of the wall 18, i.e. the wall thickness for the outer wall is non-uniform. A cross-section of the outer wall 18 is shown in FIG. 6A. In this embodiment, one side of the wall 18 is significantly thicker than the other side. The wall is formed with multiple eccentricities by varying the wall thickness between a maximum thickness and a minimum thickness. Thus, the gap size can be infinitely varied as the outer cylinder 12 is rotated anywhere between 0° to 180°.

Figure 6A:
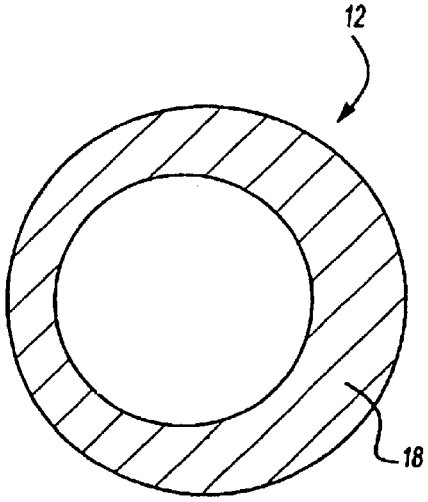
FIG. 6A is a cross-section of one embodiment of the outer cylinder.
Figure 6B:
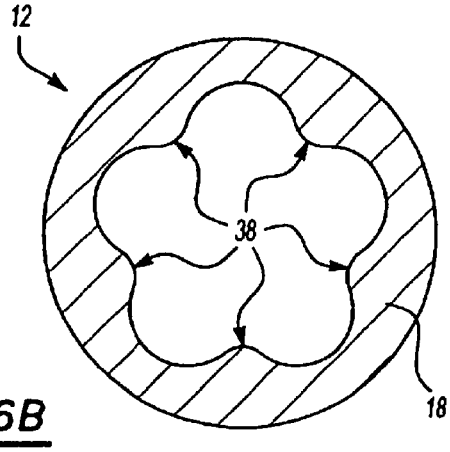
FIG. 6B is a cross-section of an alternate embodiment of the outer cylinder.

An alternate embodiment for a cross-section of the outer cylinder 12 is shown in FIG. 6B. In this embodiment, the outer cylinder 12 is defined by an inner diameter that presents a variable profile. An example of this is shown in FIG. 6b in which the wall 18 includes multiple waves or steps 38 formed on the inner surface to vary gap size between multiple widths as the outer cylinder 12 is rotated between 0° to 180°.

Thus, the eccentric inner diameter to outer diameter profile changes the flow gap width in relation to the ports 26 to vary damping. It should be understood that while only two (2) ports 26 are shown in FIGS. 3–5, additional ports could also be formed within the inner wall 20.

Figure 3A:
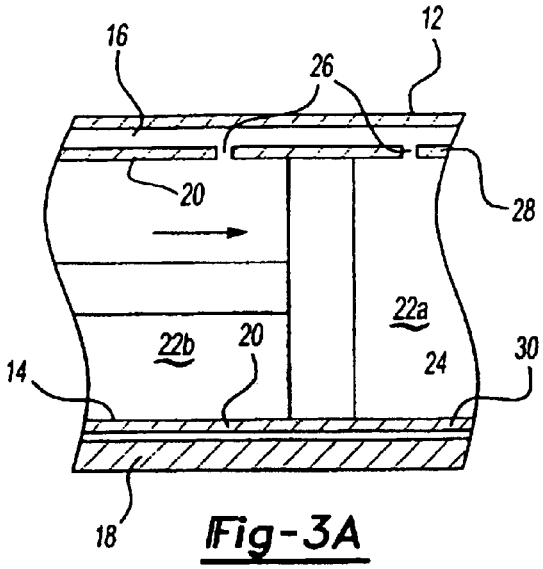
FIG. 3A is a cross-sectional cut-away view of a shock absorber incorporating the subject invention adjusted to a low damping position.
Figure 3B:
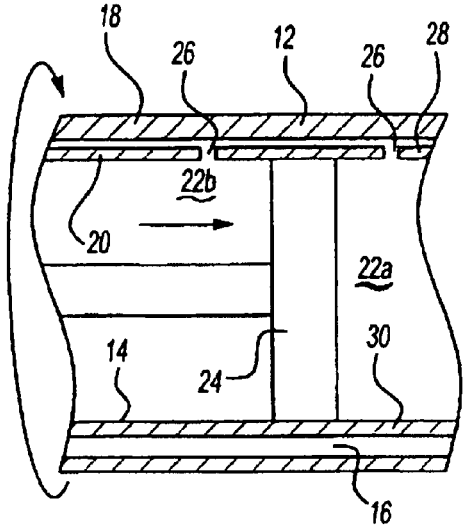
FIG. 3B is a cross-sectional cut-away view of the shock absorber of FIG. 3A adjusted to in a high damping position.

In one embodiment, shown in FIGS. 3A and 3B, the gap size is uniform and constant in cross-section along the longitudinal direction (length) of the cylinders 12, 14. Due to the eccentric formation of the outer cylinder 12, the ported side 28 of the inner cylinder 14 defines a first gap width in relation to the ports 26 and the non-ported side 30 of the inner cylinder 14 defines a second gap width between the inner 14 and outer 12 cylinders. In the low damping force configuration, shown in FIG. 3A, the first gap width is greater than the second gap width. In the high damping force configuration, shown in FIG. 3B, the outer cylinder 12 is rotated such that the first gap width is less than the second gap width. Due to the decrease in gap width in relation to the ports 26, less fluid can flow back and forth between the compression 22a and rebound 22b sides of the piston 24 as compared to the amount of fluid flowing in the low damping configuration.

Figure 4A:
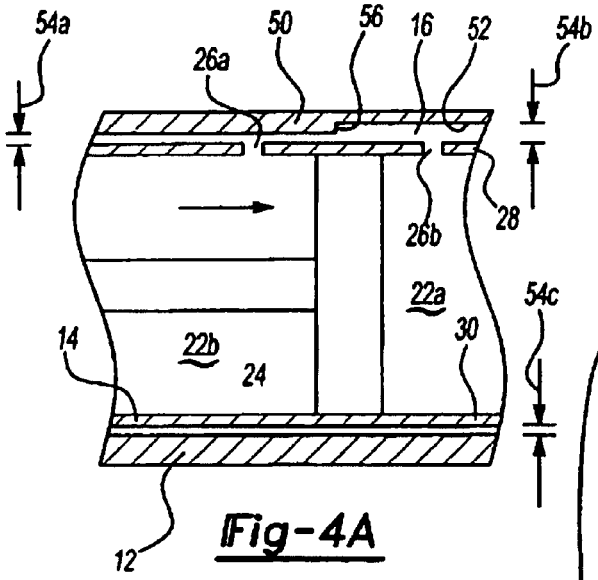
FIG. 4A is a cross-sectional cut-away view of an alternate embodiment incorporating the subject invention adjusted to a low damping position.
Figure 4B:
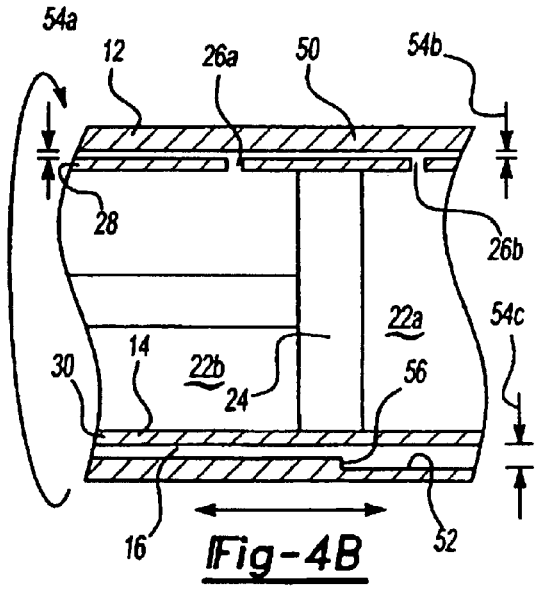
FIG. 4B is a cross-sectional cut-away view of the shock absorber of FIG. 4A adjusted to in a high damping position.

In an alternate embodiment, shown in FIGS. 4A and 4B, the outer cylinder 12 includes a stepped surface to provide variable gap widths for different ports 26. In this embodiment, the outer cylinder 12 is defined by a wall 50 having a stepped inner surface 52. In this embodiment, the gap 16 is non-uniform and variable along the longitudinal direction of the cylinders 12, 14. The gap widths for each port 26 in relation to the stepped inner surface are different with respect to each other. For example, a first gap width 54a is defined between one of the ports 26a and the outer cylinder 12 and a second gap width 54b is defined between another of the ports 26b and the outer cylinder 12. A step 56 decreases the size of the first gap width 54a. A third gap width 54c is defined between the non-ported side 30 of the inner cylinder 14 and the outer cylinder 12.

In the low damping force configuration, shown in FIG. 4A, the first gap width 54a is less than the second gap width 54b and both the first 54a and second 54b gap widths are greater than the third gap width 54c. In the high damping force configuration, shown in FIG. 4B, the outer cylinder 12 is rotated or translated such that the first gap width 54a and the second gap widths 54b are both less than the third gap width 54c. Due to the decrease in gap width in relation to the ports 26 in the high damping force position, less fluid can flow back and forth between the compression 22a and rebound 22b sides of the piston 24 as compared to the amount of fluid flowing in the low damping configuration. But, in the low damping configuration, damping force is further adjusted by providing different gap widths between each of the ports 26 and the outer cylinder 12. It should be understood that while two ports 26 are shown in FIGS. 4A and 4B, additional ports 26 and additional steps 56 could be formed to provide further damping adjustment.

Figure 5A:
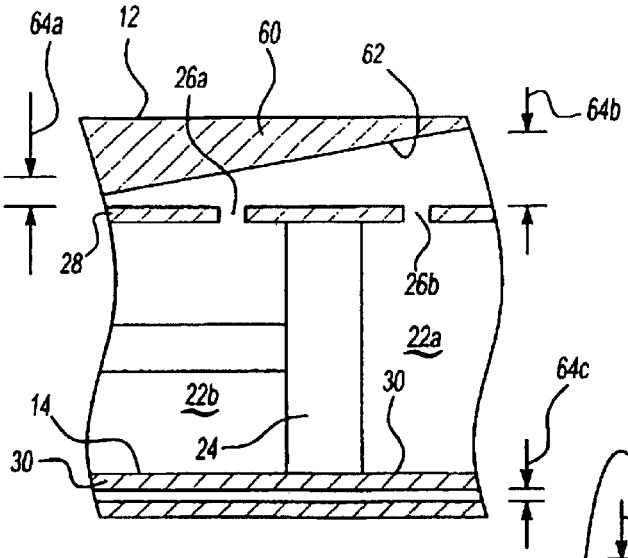
FIG. 5A is a cross-sectional cut-away view of an alternate embodiment incorporating the subject invention adjusted to a low damping position.
Figure 5B:
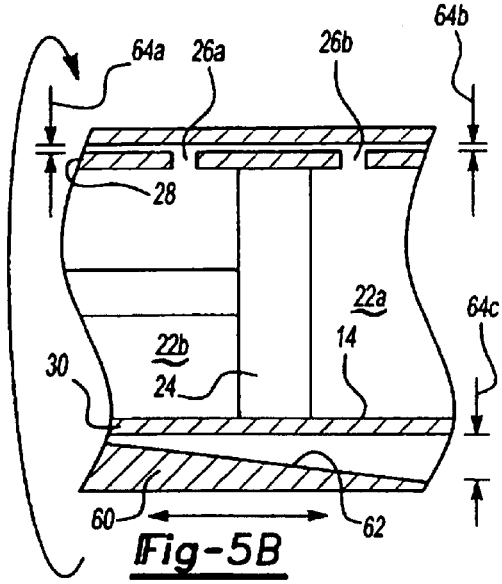
FIG. 5B is a cross-sectional cut-away view of the shock absorber of FIG. 5A adjusted to in a high damping position.

In an alternate embodiment, shown in FIGS. 5A and 5B, the outer cylinder 12 includes a tapered surface to provide variable gap widths for different ports 26. In this embodiment, the outer cylinder 12 is defined by a wall 60 having a tapered inner surface 62 providing multiple diameter changes along the length of the wall 60. In this embodiment, the gap 16 is non-uniform and variable along the longitudinal direction of the cylinders 12, 14. The gap widths for each port 26 in relation to the tapered inner surface 62 are different with respect to each other. For example, a first gap width 64a is defined between one of the ports 26a and the outer cylinder 12 and a second gap width 64b is defined between another of the ports 26b and the outer cylinder 12. The tapered surface 62 decreases the size of the first gap width 64a in comparison to the second gap width 64b. A third gap width 64c is defined between the non-ported side 30 of the inner cylinder 14 and the outer cylinder 12.

In the low damping force configuration, shown in FIG. 5A, the first gap width 64a is less than the second gap width 64b and both the first 64a and second 64b gap widths are greater than the third gap width 64c. In the high damping force configuration, shown in FIG. 5B, the outer cylinder 12 is rotated or translated such that the first gap width 64a and the second gap width 64b are both less than the third gap width 64c. Due to the decrease in gap width in relation to the ports 26 in the high damping force position, less fluid can flow back and forth between the compression 22a and rebound 22b sides of the piston 24 as compared to the amount of fluid flowing in the low damping configuration. But, in the low damping configuration, damping force is further adjusted by providing different gap widths between each of the ports 26 and the outer cylinder 12. It should be understood that while two ports 26 are shown in FIGS. 5A and 5B, additional ports 26 could be formed to provide further damping adjustment.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

We claim:

1. A shock absorber assembly comprising:

a first cylinder having an outer wall *with a thickness defined by a constant outer diameter and a variable inner diameter*;

a second cylinder mounted within said first cylinder and having an inner wall enclosing a chamber[,] *wherein said first cylinder comprises an outermost shock absorber cylinder and said second cylinder comprises an innermost shock absorber cylinder with* said inner wall being spaced apart from said outer wall to define a gap extending longitudinally between said [first] *outermost* and [second] *innermost shock absorber* cylinders;

a piston mounted within said second cylinder to separate said chamber into a rebound side and a compression side, said piston being movable along a longitudinal path relative to said inner wall to dampen vibrations;

a plurality of ports formed within said inner wall to define a sealed fluid path wherein fluid flows bi-directionally within said gap and into and out of said rebound and compression sides of said chamber via said *plurality of* ports in response to said piston moving back and forth within said chamber; and an actuator for selectively adjusting [the] *a* damping force by axially translating said outer wall relative to said inner wall in a direction parallel to said longitudinal path to vary the size of said gap.

2. The assembly according to claim 1 wherein said outer wall is defined by an inner diameter having a first center and an outer diameter having a second center that is different than said first center to define an eccentric inner diameter to outer diameter profile for said outer wall.

3. The assembly according to claim 2 wherein said gap is defined as a ring-shaped gap, said gap having a variable cross-section along [said] *a* longitudinal direction.

4. The assembly according to claim 3 wherein said inner wall has a ported portion and a non-ported portion with all of said *plurality of* ports being formed along said ported portion of said inner wall and wherein said eccentric inner diameter to outer diameter profile defines a first gap width between one of said *plurality of* ports and said outer wall, a second gap width between another of said *plurality of* ports and said outer wall, and a third gap *width* between said non-ported portion of said inner wall and said outer wall, said outer wall being longitudinally translated to adjust said first, second, and third gap widths to control the damping force.

5. The assembly according to claim 4 wherein said outer wall is longitudinally translatable between a low damping force position where said first gap width is different than said second gap width and said third gap width is less than both said first and second gap widths and a high damping force position where said third gap width is greater than both of said first and second gap widths.

6. The assembly according to claim 5 wherein said outer wall includes a stepped inner surface to define said first and second gap widths.

7. The assembly according to claim 6 wherein gap widths between each of said plurality of ports and said outer wall are varied with respect to each other.

8. The assembly according to claim 7 wherein said stepped inner surface includes one step of variable height for each of said *plurality of* ports.

9. The assembly according to claim 1 wherein said actuator is a grip portion formed on an exterior surface of said first cylinder, said grip portion being manually translated along said direction parallel to said longitudinal path to vary the size of said gap in relation to said *plurality of* ports.

10. The assembly according to claim 1 wherein said actuator is an electrical control for selectively translating said first cylinder along said direction parallel to said longitudinal path under predetermined conditions to vary the size of said gap in relation to said *plurality of* ports.

[11. A shock absorber assembly comprising:

a first cylinder having an outer wall with a thickness defined by a constant outer diameter and a variable inner diameter;

a second cylinder mounted within said first cylinder and having an inner wall enclosing a chamber and spaced apart from said outer wall to define a gap extending longitudinally between said first and second cylinders;

a damping mechanism mounted within said second cylinder to separate said chamber into a rebound side and a compression side wherein said damping mechanism moves longitudinally relative to said inner wall for damping vibrations; and a plurality of ports formed within said inner wall to define a fluid path wherein fluid flows bi-directionally within said gap and into and out of said rebound and compression sides of said chamber via said ports as said first cylinder is moved relative to said second cylinder to selectively adjust damping by varying gap size.]

[12. The assembly of claim 11 wherein said outer wall is continuously solid along a longitudinal length of said first cylinder with said inner diameter varying along the longitudinal length to define a variable inner diameter to outer diameter profile.]

[13. The assembly according to claim 12 wherein said inner wall has a ported portion and a non-ported portion with all of said ports being formed along said ported portion of said inner wall and wherein said variable inner diameter to outer diameter profile defines a first gap width between one of said ports and said outer wall, a second gap width between another of said ports and said outer wall, and a third gap width between said non-ported portion of said inner wall and said outer wall, said outer wall being rotated to adjust said first, second, and third gap widths to control the damping force.]

[14. The assembly according to claim 13 wherein said variable inner diameter to outer diameter profile is uniform in cross section; and said outer wall is rotatable between a low damping force position where said first gap width is the same as said second gap width and said third gap width is less than both said first and second gap widths and a high damping force position where said third gap width is greater than both of said first and second gap widths.]

[15. The assembly according to claim 13 wherein said variable inner diameter to outer diameter profile is non-uniform in cross section; and said outer wall is rotatable between a low damping force position where said first gap width is different than said second gap width and said third gap width is less than both said first and second gap widths and a high damping force position where said third gap width is greater than both of said first and second gap widths.]

[16. The assembly according to claim 15 wherein said outer wall includes a stepped inner surface to define said first and second gap widths.]

[17. The assembly according to claim 15 wherein said outer wall includes a tapered inner surface to define said first and second gap widths.]

[18. The assembly according to claim 11 wherein said first cylinder is rotated relative to said second cylinder to vary gap size.]

19. [The assembly according to claim 11] *A shock absorber assembly comprising:*

*a first cylinder having an outer wall with a thickness defined by a constant outer diameter and a variable inner diameter;*

*a second cylinder mounted within said first cylinder and having an inner wall enclosing a chamber wherein said first cylinder comprises an outermost shock absorber cylinder and said second cylinder comprises an innermost shock absorber cylinder, said outermost shock absorber cylinder surrounding a substantial length of said innermost shock absorber cylinder such that said inner wall is spaced apart from said outer wall to define a gap extending longitudinally between said outermost and innermost shock absorber cylinders;*

*a damping mechanism mounted within said second cylinder to separate said chamber into a rebound side and a compression side wherein said damping mechanism moves longitudinally relative to said inner wall for damping vibrations; and*

*a plurality of ports formed within said inner wall to define a fluid path wherein fluid flows bi-directionally within said gap and into and out of said rebound and compression sides of said chamber via said plurality of ports as said first cylinder is moved relative to said second cylinder to selectively adjust damping by varying a size of said gap* wherein said first cylinder is axially translated relative to said second cylinder to vary [gap] *a* size *of said gap.*

[20. The assembly according to claim 11 wherein said variable inner diameter presents a radially variable profile.]

[21. The assembly of claim 11 wherein said variable inner diameter varies both in a radial direction and a longitudinal direction along a longitudinal length of said outer wall.]

[22. A method for adjusting damping force in a shock absorber comprising the steps of:

(a) mounting a first cylinder having an inner wall defining a chamber within a second cylinder having a solid outer wall with a variable thickness defined by a constant outer diameter and a variable inner diameter by spacing the outer wall apart from the inner wall to define a gap extending longitudinally between said first and second cylinders;

(b) mounting a damping mechanism within the chamber of the first cylinder to define a compression side and a rebound side with the damping mechanism moving longitudinally relative to the inner wall for damping vibrations; and (c) moving the second cylinder with respect to the first cylinder to adjust the size of the gap to selectively change the damping force.]

[23. The method according to claim 22 including forming a plurality of longitudinally spaced ports in the inner wall on one side of the first cylinder to define a fluid flow path wherein fluid flows bi-directionally within the gap and into and out of the rebound and compression sides via the ports; defining a first gap width between the ports and the outer wall and a second gap width between an opposite side of the first cylinder from the ports and the outer wall; moving the second cylinder such that the first gap width is greater than the second gap width for a low damping force.]

[24. The method according to claim 22 including forming a plurality of longitudinally spaced ports in the inner wall on one side of the first cylinder to define a fluid flow path wherein fluid flows bi-directionally within the gap and into and out of the rebound and compression sides via the ports; defining a first gap width between the ports and the outer wall and a second gap width between an opposite side of the first cylinder from the ports and the outer wall; moving the second cylinder such that the second gap width is greater than the first gap width for a high damping force.]

[25. The method according to claim 22 including forming a plurality of longitudinally spaced ports in the inner wall on one side of the first cylinder to define a fluid flow path wherein fluid flows bi-directionally within the gap and into and out of the rebound and compression sides via the ports; defining a first gap width between one of the ports and the outer wall, a second gap width between another of the ports and the outer wall, and a third gap width between an opposite side of the first cylinder from the ports and the outer wall; moving the second cylinder such that the first gap width is different than the second gap width and the third gap width is less than both the first and second gap widths for a low damping force.]

[26. The method according to claim 22 including forming a plurality of longitudinally spaced ports in the inner wall on one side of the first cylinder to define a fluid flow path wherein fluid flows bi-directionally within the gap and into and out of the rebound and compression sides via the ports;

defining a first gap width between one of the ports and the outer wall, a second gap width between another of the ports and the outer wall, and a third gap width between an opposite side of the first cylinder from the ports and the outer wall; moving the second cylinder such that the third gap width is greater than both of the first and second gap widths for a high damping force.]

[27. The method according to claim 22 wherein step (c) further includes rotating the second cylinder relative to the first cylinder.]

28. [The method according to claim 22] *A method for adjusting damping force in a shock absorber comprising the steps of:*

(*a*) *mounting a first cylinder having an inner wall defining a chamber within a second cylinder having a solid outer wall with a variable thickness defined by a constant outer diameter and a variable inner diameter by spacing the outer wall apart from the inner wall to define a gap extending longitudinally between the first and second cylinders and wherein the first cylinder comprises an innermost shock absorber cylinder and the second cylinder comprises an outermost shock absorber cylinder with the outermost shock absorber cylinder surrounding a substantial length of the innermost shock absorber cylinder such that the gap is formed between the outermost and innermost shock absorber cylinders;*

(*b*) *mounting a damping mechanism within the chamber of the first cylinder to define a compression side and a rebound side with the damping mechanism moving longitudinally relative to the inner wall for damping vibrations;*

(*c*) *forming a plurality of longitudinally spaced ports in the inner wall on one side of the first cylinder to define a fluid flow path wherein fluid flows bi-directionally within the gap and into and out of the rebound and compression sides via the plurality of longitudinally spaced ports; and*

(*d*) *moving the second cylinder with respect to the first cylinder to adjust the size of the gap to selectively change a damping force* wherein step [(c)] (*d*) further includes axially translating the second cylinder relative to the first cylinder.

[29. The method according to claim 22 wherein the outer wall is continuously solid along a longitudinal length of the outer wall and wherein step (a) further includes defining the variable inner diameter as varying in a radial direction and a longitudinal direction along the longitudinal length of the outer wall to define a variable inner diameter to outer diameter profile.]

[30. A shock absorber assembly comprising:

a first cylinder having a solid outer wall with a thickness defined by a constant outer diameter and a variable inner diameter;

a second cylinder mounted within said first cylinder and having an inner wall enclosing a chamber, said inner wall being spaced apart from said outer wall to define a gap extending longitudinally between said first and second cylinders;

a piston mounted within said second cylinder to separate said chamber into a rebound chamber and a compression chamber, said piston being longitudinally movable relative to said inner wall to dampen vibrations;

a plurality of longitudinally spaced ports formed within said inner wall to define a fluid path wherein fluid flows bi-directionally within said gap and into and out of said rebound and compression chambers via said ports in response to said piston moving back and forth within said chamber; and an actuator for selectively adjusting the damping force by moving said inner and outer walls relative to each other to vary the size of said gap.]

[31. The assembly according to claim 30 wherein said variable inner diameter varies in both a radial direction and a longitudinal direction along a length of the outer wall.]

32. [The assembly according to claim 31] *A shock absorber assembly comprising:*

*a first cylinder having a solid outer wall with a thickness defined by a constant outer diameter and a variable inner diameter wherein said variable inner diameter varies in both a radial direction and a longitudinal direction along a length of the outer wall;*

*a second cylinder mounted within said first cylinder and having an inner wall enclosing a chamber wherein said first cylinder comprises an outermost shock absorber cylinder and said second cylinder comprises an innermost shock absorber cylinder, said outermost shock absorber cylinder surrounding a substantial length of said innermost shock absorber cylinder such that said inner wall is spaced apart from said outer wall to define a gap extending longitudinally between said outermost and innermost shock absorber cylinders;*

*a piston mounted within said second cylinder to separate said chamber into a rebound chamber and a compression chamber, said piston being longitudinally movable relative to said inner wall to dampen vibrations;*

*a plurality of longitudinally spaced ports formed within said inner wall to define a fluid path wherein fluid flows bi-directionally within said gap and into and out of said rebound and compression chambers via said plurality of longitudinally spaced ports in response to said piston moving back and forth within said chamber; and*

*an actuator for selectively adjusting a damping force by moving said inner and outer walls relative to each other to vary the size of said gap* wherein said *variable* inner diameter is formed with a wave profile having alternating minimum and maximum diameters.

[33. The assembly according to claim 31 wherein said inner diameter is formed with a tapered profile tapering from a maximum inner diameter to a minimum inner diameter along the length of the outer wall.]

[34. The assembly according to claim 31 wherein said inner diameter is formed with a stepped profile with a first inner diameter positioned at one of said ports and a second inner diameter longitudinally spaced from said first inner diameter and positioned at another of said ports with said second inner diameter being greater than said first inner diameter.]

[35. The assembly according to claim 31 wherein said outer wall is rotated relative to said inner wall to adjust the size of said gap.]

36. [The assembly according to claim 31] *A shock absorber assembly comprising:*

*a first cylinder having a solid outer wall with a thickness defined by a constant outer diameter and a variable inner diameter wherein said variable inner diameter varies in both a radial direction and a longitudinal direction along a length of the outer wall;*

*a second cylinder mounted within said first cylinder and having an inner wall enclosing a chamber wherein said first cylinder comprises an outermost shock absorber cylinder and said second cylinder comprises an inner-*

*most shock absorber cylinder, said outermost shock absorber cylinder surrounding a substantial length of said innermost shock absorber cylinder such that said inner wall is spaced apart from said outer wall to define a gap extending longitudinally between said outermost and innermost shock absorber cylinders;*

*a piston mounted within said second cylinder to separate said chamber into a rebound chamber and a compressive chamber, said piston being longitudinally movable relative to said inner wall to dampen vibrations;*

*a plurality of longitudinally spaced ports formed within said inner wall to define a fluid path wherein fluid flows bi-directionally within said gap and into and out of said rebound and compression chambers via said plurality of longitudinally spaced ports in response to said piston moving back and forth within said chamber; and*

*an actuator for selectively adjusting a damping force by moving said inner and outer walls relative to each other to vary the size of said gap* wherein said outer wall is longitudinally translated relative to said inner wall to adjust the size of said gap.

[37. The assembly according to claim 30 wherein said outer wall has an variable cross-sectional area along a longitudinal length of the first cylinder.]

[38. The assembly according to claim 37 wherein said variable cross-sectional area is infinitely variable between a minimum cross-sectional area and a maximum cross-sectional area.]

[39. The assembly according to claim 37 wherein said variable cross-sectional area increases from a minimum cross-sectional area to a maximum cross-sectional area at discrete intervals.]

* * * * *